United States Patent [19]
Frutschi

[11] Patent Number: 5,613,356
[45] Date of Patent: Mar. 25, 1997

[54] METHOD OF COOLING THERMALLY LOADED COMPONENTS OF A GAS TURBINE GROUP

[75] Inventor: Hans-Ulrich Frutschi, Riniken, Switzerland

[73] Assignee: ABB Management AG, Baden, Switzerland

[21] Appl. No.: 397,498

[22] Filed: Mar. 2, 1995

[30] Foreign Application Priority Data

Mar. 21, 1994 [DE] Germany ............... 44 09 567.8

[51] Int. Cl.$^6$ ............................................ F02C 6/18
[52] U.S. Cl. ........................ 60/39.02; 60/39.182
[58] Field of Search ............... 60/39.02, 39.05, 60/39.182

[56] References Cited

U.S. PATENT DOCUMENTS 4,424,668  1/1984  Mukherjee ............. 60/39.182
5,412,937  5/1995  Tomlinson et al. .......... 60/39.182

FOREIGN PATENT DOCUMENTS

4220073A1  12/1993  Germany.

*Primary Examiner*—Louis J. Casaregola
*Attorney, Agent, or Firm*—Burns, Doane, Swecker & Mathis, L.L.P.

[57] ABSTRACT

In a method for cooling thermally loaded components of a gas turbine group as part of a combined installation which, in addition, also consists of a waste heat steam generator and a steam cycle, a quantity of saturated steam is extracted from a drum of the steam cycle. The components mentioned, namely the combustion chamber and the turbine, are cooled in series by this saturated steam and the steam is subsequently returned to a steam turbine of the steam cycle at an appropriate location. The steam, from the steam turbine, employed for cooling is moderated, if required, with a proportion of water from the waste heat steam generator upstream of the components to be cooled.

4 Claims, 3 Drawing Sheets

METHOD OF COOLING THERMALLY LOADED COMPONENTS OF A GAS TURBINE GROUP

BACKGROUND OF THE INVENTION

1. Field of the Invention

The present invention relates to a method for cooling a gas turbine apparatus in a combined gas turbine and waste heat steam turbine installation.

2. Discussion of Background

In a combined thermal power station installation, air is generally extracted from the process and supplied to the thermally loaded components in order to cool them. In this type of cooling, the effective mass flow of the installation is impaired throughout to the extent that the efficiency of the installation suffers losses. This is essentially associated with the fact that in combined installations of the new generation, additional air which could be branched off without sacrificing power and installation efficiency is not as a rule available as far as the turbine group is concerned.

SUMMARY OF THE INVENTION

Accordingly, one object of this invention is to provide assistance in this respect. The invention, as characterized in the claims, is based on the object of proposing, in a method of the type quoted at the beginning, measures which concern the cooling of the thermally loaded components of the installation and can increase the efficiency and specific power.

The medium steam pressure of a combined installation with triple-pressure waste heat steam generators, for example, is particularly well suited for cooling the turbine stators and the combustion chambers. For this purpose, live steam from the appropriate pressure boiler drum is superheated by the extraction of heat from the components to be cooled and is supplied to the steam turbine at a suitable location. Should the superheating mentioned be excessive, corrective action can be taken by injecting water at a suitable location. If the superheating is inadequate, on the other hand, assistance can be provided by a suitable quantity of combustion gases. With respect to the cooling philosophy of the thermally loaded components, it should be noted that the cooling can be connected in series and/or in parallel. The extraction of steam for cooling purposes is not intrinsically limited to the medium pressure boiler drum alone; the cooling steam can likewise be drawn from the low-pressure and/or from the high-pressure boiler drum.

Cooling steam can, furthermore, be extracted from an appropriate location on the steam turbine and reintroduced to the latter at a lower pressure location. The cooling steam extracted in this way can, if required, be partially or completely desuperheated by water injection. This water is advantageously extracted after the economizer.

In gas turbine arrangements with a plurality of turbines and combustion chambers in different pressure zones, the appropriate boiler drum and/or an appropriate location of the steam turbine is tapped to supply the necessary cooling steam quantities.

During the starting procedure, the relevant components to be cooled can be supplied with a cooling medium either in a conventional manner using air or by an external steam source.

The essential advantages of the invention may be seen in the fact that the lower temperature and the higher specific thermal capacity (almost double) of steam permits an essentially higher hot gas temperature for the same metal temperature as compared with air cooling. If the cooling is carried out in accordance with a closed circuit concept, this provides a better polytropic turbine efficiency than the open circuit concept, such as is usually employed in the case of air cooling. The closed circuit steam cooling of the thermally loaded components acts to provide a significant increase in the power and efficiency of the combined installation.

Advantageous and expedient further developments of the achievement of the object in accordance with the invention are characterized in the further claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
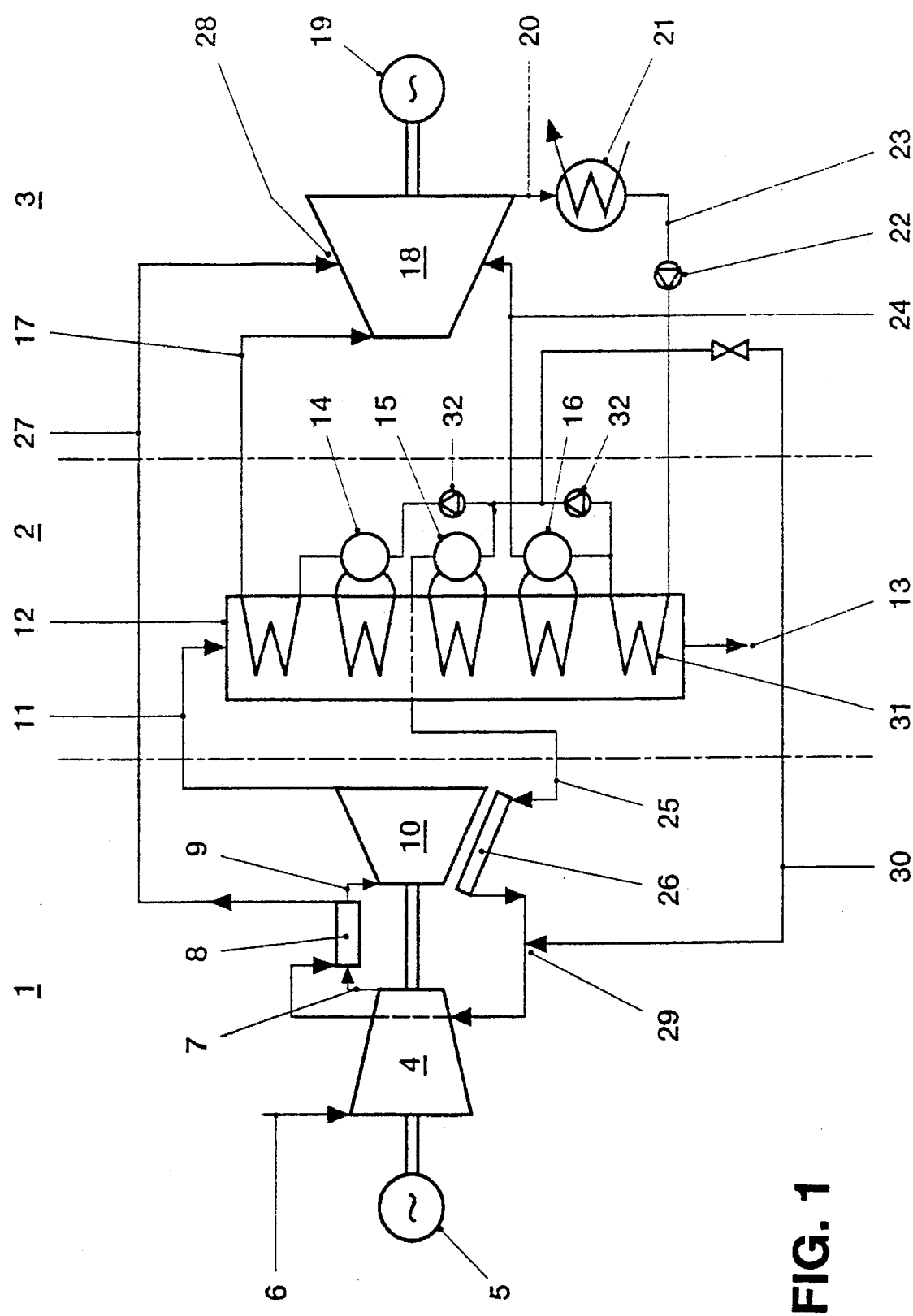
FIG. 1 shows a combined installation in which the cooling steam is extracted from the boiler drum.

Referring now to the drawings, wherein like reference numerals designate identical or corresponding parts throughout the several views, where all the elements not necessary for direct understanding of the invention are omitted and where the flow directions of the various media are indicated by arrows, FIG. 1 shows a combined installation which consists of a gas turbine group 1, a waste heat steam generator 2 and a steam cycle 3. The gas turbine group 1, the waste heat steam generator 2 and the steam cycle 3 are represented by their more important components. The gas turbine group 1 consists of a compressor 4 which is coupled to a generator 5. The induced fresh air 6 is brought up to pressure in the compressor 4. The air 7 compressed in this way is then treated in a downstream combustion chamber 8 to provide hot gas 9 which is subsequently admitted to a downstream turbine 10. Conversion of the energy released into electricity takes place in the generator 5 mentioned, this machine 5 being designed in such a way that it can also undertake motor functions; this is regularly the case during the starting of the gas turbine group 1. The combustion chamber 8 is operated with a gaseous and/or liquid fuel. After expansion in the turbine 10, the exhaust gases 11—which still have a high caloric potential—flow through a waste heat boiler 12 in which steam is generated by the heat exchange method. This steam then forms the working medium of the downstream steam cycle 3. The calorically utilized exhaust gases subsequently flow as flue gas 13 into the open air. The waste heat boiler 12 shown here involves a multi-stage design with three drums 14, 15 and 16. High-pressure steam 17 is generated from the thermal energy released in the waste heat boiler 12 and this high-pressure steam 17 is admitted to a steam turbine 18 but via an intermediate superheater (which is not shown). After a first partial expansion, it is of course possible to reheat the steam in a reheater and to admit it subsequently to a medium-pressure turbine and a low-pressure turbine. The energy arising from the steam turbine 18 is converted into electricity by means of a coupled generator 19. The expanded steam 20 is condensed in a water-cooled or air-cooled condenser 21. The condensate 23 is delivered by a condensate pump 22 acting downstream of the condenser 21 into a feedwater tank and degasifier (which is not shown). A further pump (which is not shown) subsequently pumps the water into the waste heat boiler 12. The water first passes through an economizer 31 and subsequently flows through the various pressure stages of the exhaust gas boiler 12, with the drums 16, 15 and 14, and interdependent flow guidance maintained by various pumps 32. Low-pressure steam 24 is extracted from the drum 16 for additional admission to the steam turbine 18. A quantity of saturated steam 25 is extracted from the medium-pressure drum 15. In fulfillment of its cooling duty, this saturated steam 25 is first fed through the stator 26 of the turbine 10 and subsequently through the walls to be cooled of the combustion chamber 8. This superheats the saturated steam 25 and it is then supplied as working steam 27, with a correspondingly increased work potential, to the steam turbine 18 at an appropriate location 28. In order to keep the resulting superheat within permissible limits, water 30—as condensate preheated in the economizer 31—can be supplied to the cooling steam at an appropriate location 29. For simplicity, the medium-pressure and high-pressure economizers are omitted in the figure. In the case of the stator 26 at the end of the turbine, steam of lower pressure could, of course, be extracted as the cooling medium from the drum 16; in the case of gas turbines with a large pressure ratio, steam could be extracted from the drum 14 at least for the region of the combustion chamber and the high-pressure turbine. The possibility of feeding the cooling steam to the steam turbine 18 at a lower pressure location determines the choice of a convenient pressure drop for fulfilling the cooling duty. If the whole of the steam quantity generated in the drum 15 is not used for cooling, the surplus part can be supplied to the steam turbine 18.

Figure 2:
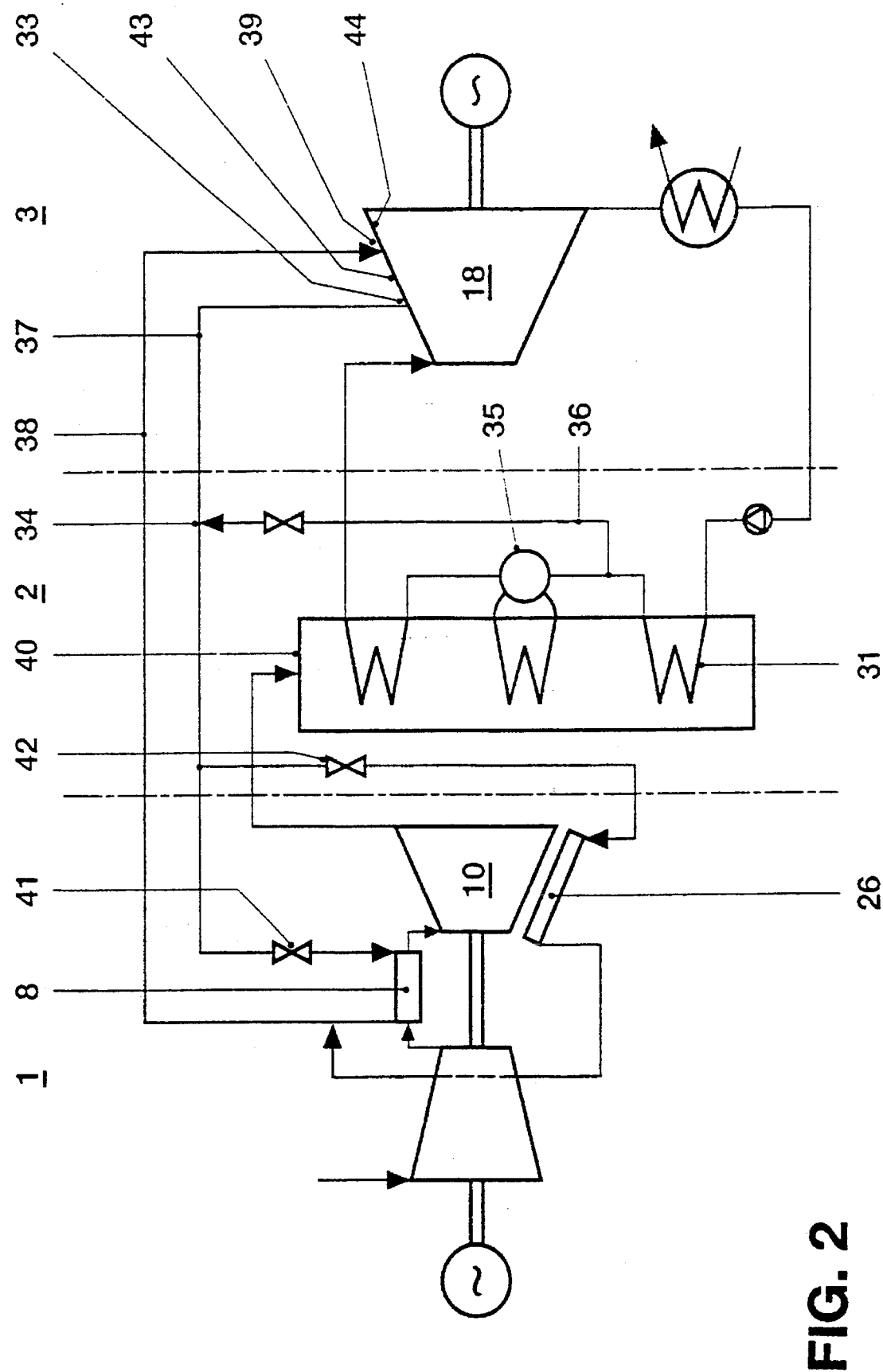
FIG. 2 shows a combined installation with closed circuit steam cooling and main steam extraction from the steam turbine and FIG. 3 shows a combined installation with sequential combustion within the gas turbine group.

FIG. 2 essentially shows the circuit in accordance with FIG. 1. Particularly in the case of combined circuits with single-pressure or double-pressure boilers, there may—under certain circumstances—be no boiler drum at a pressure level suitable for extracting the cooling steam. A single-pressure boiler 40 is shown in FIG. 2. The steam pressure in the components to be cooled should always be somewhat above the gas pressure of the components in order to avoid gas leaks into the steam cycle. Too much surplus pressure, in turn, signifies an unnecessary loss of energy. In this case, extraction of cooling steam from the steam turbine 18 at a tapping location 33 is a possibility. The temperature of this steam can, under certain circumstances, be too high so that action must be taken. For this purpose, a quantity of water is extracted downstream of the economizer 31 and upstream of the drum 35 and this quantity of water flows, via a conduit 36 equipped with a valve, into the steam extraction conduit 37 at the location 34. The cooling steam passes via the conduit 37 to the stator 26 of the turbine 10, on the one hand, and to the combustion chamber 8, on the other. After the cooling of the thermally loaded components has taken place, this steam has become superheated and it is then supplied as working steam with a correspondingly increased work potential via a conduit 38 to the steam turbine 18 at an appropriate location 39. The cooling of the turbine 10 and the combustion chamber 8 takes place individually in this case by the conduit 37 branching upstream of the components mentioned, the return of the superheated steam again taking place jointly via a single conduit 38. Corresponding valves 41 and 42 ensure individual steam quantities to the individual components. In order to keep energy losses as small as possible during part-load operation, the steam extraction and the steam return can take place at locations with lower or higher pressure, as is indicated by the locations 43 and 44. In this case, the change-over takes place by means of valves (which are not shown).

Figure 3:
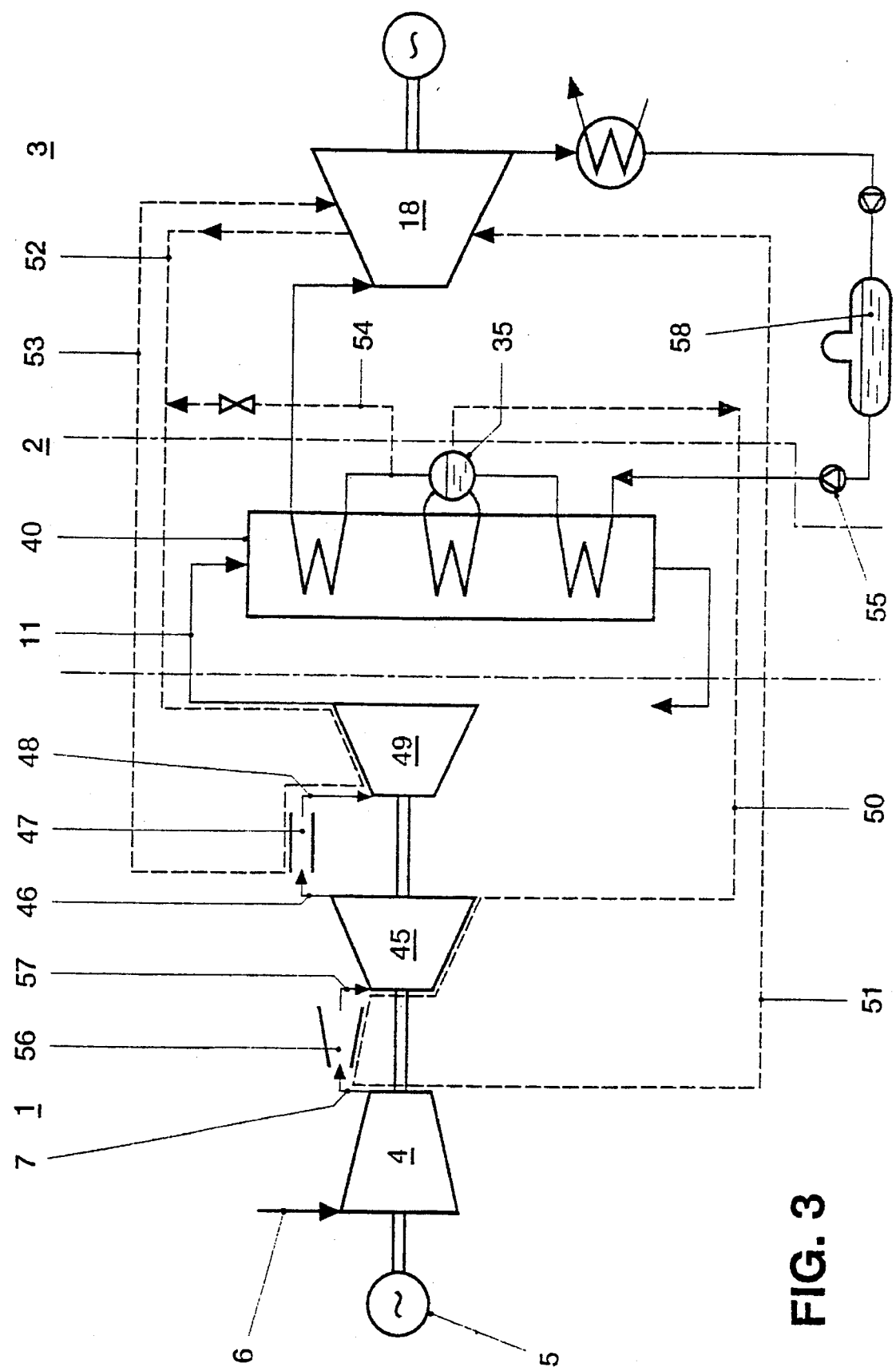

FIG. 3 shows a further combined circuit which differs from the previous circuits essentially in the fact that the gas turbine group 1 has sequential combustion with two turbines, the steam cycle 3 being supplemented by a degasifier 58 and associated pump 55. The compressed air 7 from the compressor 4 first passes into a first combustion chamber 56, which is operated by a liquid and/or gaseous fuel and which is advantageously configured as an annular combustion chamber. The hot gases 27 prepared in it are admitted to a high-pressure turbine 45 which has a relatively low expansion ratio in such a way that the exhaust gases 46 still have quite a high temperature. These exhaust gases flow into a second combustion chamber 47 which is advantageously configured as an annular combustion chamber where the combustion advantageously takes place by self-ignition. These hot gases 48 are subsequently admitted to a low-pressure turbine 49. The exhaust gases 11 then flow in the usual manner through the waste heat boiler 40. Doubling the number of thermally loaded components to be cooled demands an increase in the cooling steam quantity. The first combustion chamber 56 and the high-pressure turbine 45 are cooled in series by steam 50 from the drum 35. The superheated steam from this cooling operation is then introduced into the steam turbine 18 at an appropriate location via a return conduit 51. The second combustion chamber 47 and the low-pressure turbine 49 are likewise cooled in series by steam 52 from the steam turbine 18. Here again, the superheated steam is introduced into the steam turbine 18 at an appropriate location via a return conduit 53. A further conduit 54, which is equipped with a valve and opens into the cooling steam flow 52, ensures mixing of the cooling steam with superheated steam if required. The cooling of the individual components can also take place in parallel, as has already been shown in FIG. 2. Fundamentally, it should be noted that the cooling steam from the steam turbine 18 has a milder effect, as compared with saturated steam from the drum 35. In the latter case, the cooling is greater but account must then be taken of the resulting thermal stresses. Finally, a waste heat steam system in accordance with the high-pressure principle is also possible in this case and the cooling steam extraction from the boiler drums and from the steam turbines can be arranged in an optimum manner.

Because experience shows that the cooling systems cannot be completely leaktight, a certain loss of steam into the gas turbine cycle has to be expected during the course of the cooling operation. Although this increases the specific power, it impairs the gain in efficiency obtainable by steam cooling. Fundamentally, the cooling of the rotating parts of the turbines 10, 45 and 49 can likewise be carried out by steam in the closed circuit system. In this case, particular attention has to be paid to the leakage losses. If required, it is of course also possible to cool the steam turbine with steam which is branched off from the boiler drum 35, this steam being fed back to the steam turbine 18 right at inlet, using the superheat pressure drop. Valve spindles and high-pressure stuffing boxes can, likewise, also be cooled by steam.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for cooling thermally loaded components of a gas turbine apparatus in a combined gas turbine and waste heat steam turbine apparatus, the gas turbine apparatus including at least a gas turbine, a compressor and a combustion chamber, and the waste heat steam turbine apparatus including at least a waste heat steam generator and a steam turbine, the method comprising the steps of:

extracting a quantity of steam from the steam turbine at a location selected so that the steam has a predetermined pressure;

dividing the extracted steam into a first branch and a second branch; directing the extracted steam in the first branch to the gas turbine and through the second branch to the combustion chamber for cooling the gas turbine and combustion chamber, wherein the steam is heated; and returning the heated steam to working steam flow of the steam turbine at a location having a lower steam pressure than the predetermined pressure at the location of the extracting step.

2. The method as claimed in claim 1, wherein the predetermined pressure of the extracted steam is greater than a gas pressure in the at least one thermally loaded component.

3. The method as claimed in claim 1, comprising the step of introducing a quantity of water into the extracted steam to lower the temperature of the steam before being directed to the at least one thermally loaded component.

4. The method as claimed in claim 3, wherein the water comprises condensate taken from the waste heat steam generator.

\* \* \* \* \*